June 28, 1960 — J. C. SYLVESTER — 2,942,400
ROTARY LAWN MOWERS
Filed Aug. 7, 1958
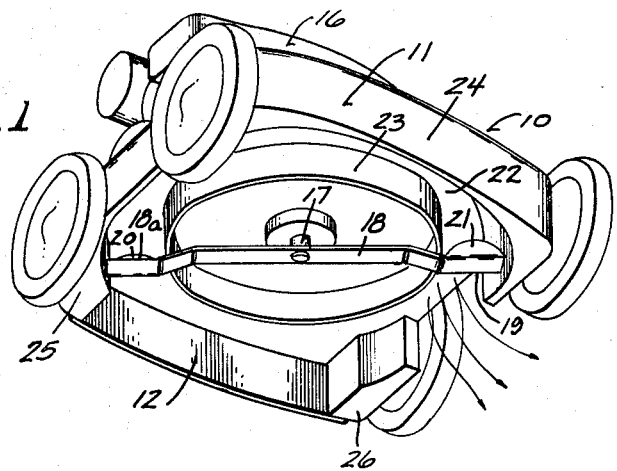
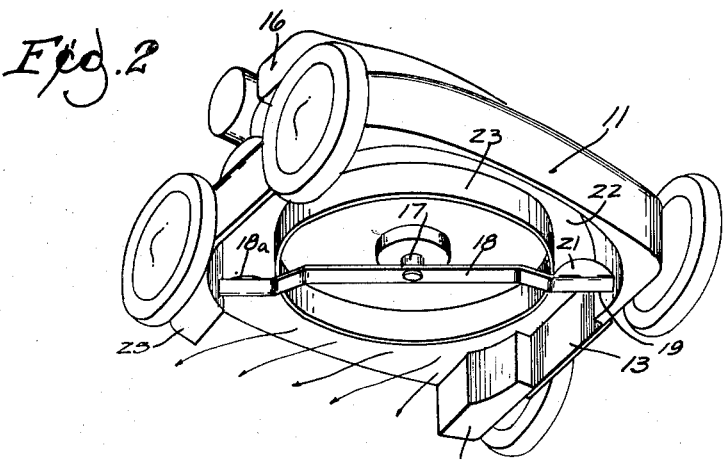
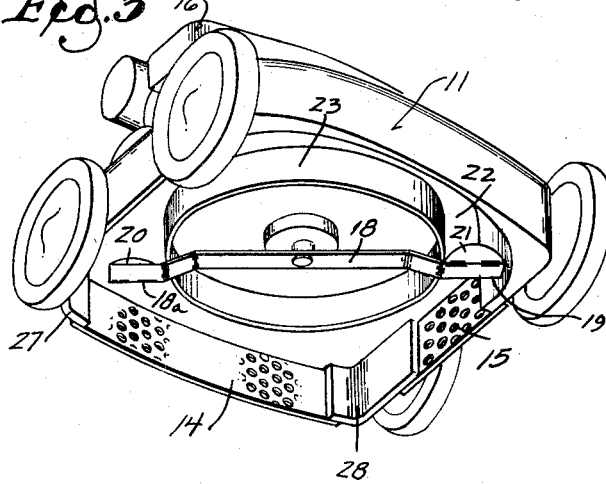
INVENTOR.
JACK C. SYLVESTER
BY
Gerald P. Welch
ATTORNEY

United States Patent Office 2,942,400
Patented June 28, 1960

2,942,400
ROTARY LAWN MOWERS

Jack C. Sylvester, 4041 N. 42nd St., Milwaukee, Wis.

Filed Aug. 7, 1958, Ser. No. 753,799

1 Claim. (Cl. 56—255)

This invention relates to improvements in rotary lawn mowers, and more particularly to a novel mower of the rotary horizontal blade type.

An object of the invention is to provide a device of the type provided with a circular vertical baffle to confine the cuttings to a restricted area or channel which increases mulching and aids in ejection of the cuttings.

Another object of the invention is to provide a device in which the draft created by the blade fins will be held within the confines of the channel formed by an inner circular baffle and the outer guard or skirt of the housing, also preventing the accumulation of clippings anywhere within the confined area.

Other and further objects of the invention will appear as the description proceeds, reference being had to the accompanying drawing, in which:

Fig. 1 is a perspective view underneath a rotary lawn mower embodying the invention.

Fig. 2 is a similar view with the rear guard plate removed and the side guard plate in place.

Fig. 3 is a view in perspective from below of the device showing both rear and side mulching plates in position.

Referring more particularly to the drawings, the numeral 10 refers to the mower generally having a housing 11 provided with a removable rear plate 12, and a removable side plate 13. A perforated rear plate 14 and a perforated side plate 15 are also provided for a mulching operation.

The housing 11 carries a conventional power plant 16 operating the vertical driven shaft 17 provided with a cutter blade 18. The blade 18 includes a main body portion and two downwardly offset sharp edges at 18ª and 19 and the inclined fins 20 and 21 oppositely disposed thereto for creating a draft in the channel at 22 formed by the circular baffle 23 the housing 11 and the skirt 24 thereof.

It will be understood that the grass and weed clippings will be more thoroughly ejected because they are confined to the channel at 22 before discharge from the mower. The box structures 25 and 26 may be replaced by more circular skirt segments 27 and 28. The rear plates 12 and 14 may be removably fastened thereto by any suitable means.

The skirt 24 depends below the outer extremities of blades 18ª and 19, and the circular baffle 23, which is located at the inner extremities of the downwardly offset blades depends slightly below the main body portion of the blade to a point just clearing the downwardly offset blades.

On use, the side plate 13 may be removed, with the result that the clippings will be ejected from the side. Alternatively, the side plate 13 may be secured in place, and the rear plate 12 may be removed to permit rear ejection of said clippings. The two perforated plates 14 and 15 are used in place of plates 12 and 13 to effect mulching of leaves or the like.

It will be understood that the device is capable of many modifications in structure and design, without departing from the spirit of the invention, within the scope of the appended claim.

Having thus described the invention, what is claimed and desired to be secured by Letters Patent of the United States is:

In a rotary lawn mower in combination, a housing having a top, a vertical power shaft depending from said top, a blade mounted on said shaft for horizontal rotation, said blade having downwardly offset cutting edges oppositely disposed for a portion of its length at the outer ends thereof, a vertical skirt depending from the perimeter of said top disposed exteriorly of the outer ends of said blade and extending below the ends thereof, and a concentric cylindrical baffle depending from the top of said housing at the approximate inner ends of said downwardly offset cutting edges to a point below the non-offset portion of said blade to form a circular cutting retaining channel.

References Cited in the file of this patent

UNITED STATES PATENTS

| 2,476,394 | Webb et al. | July 19, 1949 |
| 2,557,598 | Daggett | June 19, 1951 |
| 2,659,191 | Miller et al. | Nov. 17, 1953 |
| 2,821,831 | Thompson | Feb. 4, 1958 |
| 2,877,616 | Gewalt et al. | Mar. 17, 1959 |

FOREIGN PATENTS

| 637,832 | Great Britain | May 24, 1950 |
| 215,891 | Australia | July 4, 1958 |

Notice of Adverse Decision in Interference

In Interference No. 91,823 involving Patent No. 2,942,400, J. C. Sylvester, Rotary lawn mowers, final judgment adverse to the patentee was rendered June 21, 1962, as to claim 1.

[*Official Gazette October 16, 1962.*]